E. A. ALLRED.
CLEVIS.
APPLICATION FILED MAY 17, 1915.
1,148,275.
Patented July 27, 1915.
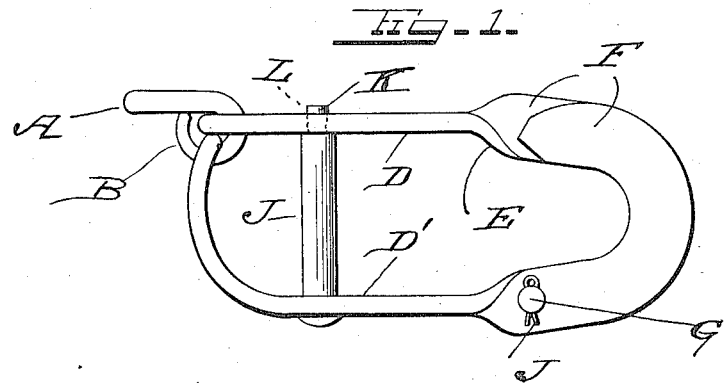
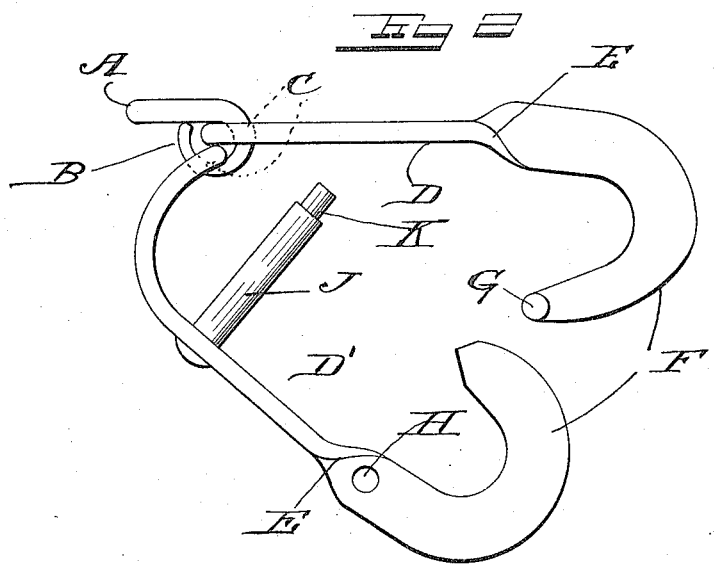
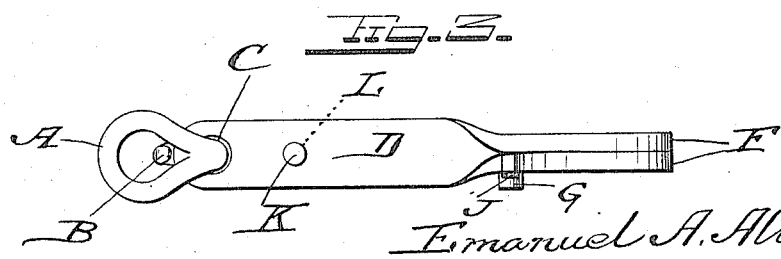
Witnesses
Ira M. Jones.
M. E. Moore
Emanuel A. Allred
Inventor
By
Attorney

UNITED STATES PATENT OFFICE.

EMANUEL A. ALLRED, OF CAREY, IDAHO.

CLEVIS.

1,148,275. Specification of Letters Patent. Patented July 27, 1915.

Application filed May 17, 1915. Serial No. 28,625.

*To all whom it may concern:*

Be it known that I, EMANUEL A. ALLRED, a citizen of the United States, residing at Carey, in the county of Blaine and State of Idaho, have invented certain new and useful Improvements in Clevises, of which the following is a specification.

My invention relates to improvements in clevises, for use upon plows, harrows, cultivators and other implements where it would serve its functions, the object being the provision of a clevis which may be instantly applied or removed, which will be of simple, durable and inexpensive construction and thoroughly efficient and practical in every particular.

With this object in view my invention consists of a clevis embodying novel features of construction and combination of parts substantially as shown, described and particularly defined by the claim.

Figure 1 represents a side elevation of a clevis constructed in accordance with and embodying my invention, in position for use. Fig. 2 represents a similar view with the parts in open or released position to receive the draft attachment, and Fig. 3 represents a top plan view of the clevis.

In the drawings: The letter A, designates the horizontally disposed eye or loop for connecting the clevis with the draft pin or ring, not shown, of the implement, which loop is formed with a vertically disposed hook B, adapted to engage openings C, in the inner ends of the horizontal flat member D, and the curved flat member D′, said members each having their outer end formed with a bend or twist E to provide the pair of similar or twin vertically disposed hooks F, which in normal position fit one upon the other, as shown in Figs. 1 and 3, one hook being formed with a pin or stud G and the other with an opening H to receive said pin or stud, which pin receives a split key or cotter pin J for retaining the hooks in closed position.

From this construction it will be understood that the device is connected to the draft pin or ring of the implement by means of the loop A and that the draft portion is connected to the hooks F and retained by said hooks in closed position, and for the purpose of retaining the said hook and the members D and D′, in proper relation I mount in the member D′ the pin J having its upper end reduced at K to fit in an opening L of the member D, which pin thus retains the members in proper vertical alinement.

From the foregoing description taken in connection with the accompanying drawings the manner of using my clevis will be readily understood and I would state that the loop A forms the connection between the clevis and implement while the swingle tree or draft means is connected to the hooks F and it will be apparent that I provide an efficient, inexpensive and practical clevis.

I claim:

The clevis herein described, consisting of the draft connecting loop, the pair of members having their inner ends connected with said loop and having their outer ends formed with a hook, one of said hooks being formed with a stud or pin and the other hook having an opening to receive said stud or pin, a key to engage the pin for securing said hooks in closed position, and a pin carried by one member and engaging the other member to retain said members in proper relative positions.

In testimony whereof I affix my signature in presence of two witnesses.

EMANUEL A. ALLRED.

Witnesses:
 JESSE T. DAVIS,
 THOS. S. PATTERSON.